(12) United States Patent
Sansegundo-Sanchez et al.

(10) Patent No.: US 8,875,728 B2
(45) Date of Patent: Nov. 4, 2014

(54) COOLED GAS DISTRIBUTION PLATE, THERMAL BRIDGE BREAKING SYSTEM, AND RELATED METHODS

(75) Inventors: Javier Sansegundo-Sanchez, Alboraya (ES); Xavier Benavides-Rel, Calvario (ES); Manuel Vales-Canle, Valencia (ES); Maria Tomas-Martinez, Murcia (ES)

(73) Assignee: Siliken Chemicals, S.L. (ES)

( * ) Notice: Subject to any disclaimer, the term of this patent is extended or adjusted under 35 U.S.C. 154(b) by 177 days.

(21) Appl. No.: 13/547,970

(22) Filed: Jul. 12, 2012

(65) Prior Publication Data

US 2014/0017137 A1 Jan. 16, 2014

(51) Int. Cl.
  *B01J 8/18* (2006.01)
  *F28D 15/00* (2006.01)
  *F16L 53/00* (2006.01)

(52) U.S. Cl.
  USPC .................... 137/334; 422/146; 165/104.11

(58) Field of Classification Search
  CPC .............. B01J 8/18; F28D 15/00; F16L 53/00
  USPC .................. 422/146; 137/334; 165/104.11
  See application file for complete search history.

(56) References Cited

U.S. PATENT DOCUMENTS

| 2,843,458 | A |   | 7/1958  | Beattie et al. |          |
|-----------|---|---|---------|----------------|----------|
| 3,016,624 | A |   | 1/1962  | Bliss          |          |
| 3,398,718 | A |   | 8/1968  | Pilloton       |          |
| 3,605,276 | A | * | 9/1971  | Enders         | 34/578   |
| 3,719,519 | A |   | 3/1973  | Perugini       |          |
| 3,906,605 | A |   | 9/1975  | McLain         |          |
| 4,084,024 | A |   | 4/1978  | Schumacher     |          |
| 4,134,514 | A |   | 1/1979  | Schumacher     |          |
| 4,140,735 | A |   | 2/1979  | Schumacher     |          |
| 4,154,870 | A |   | 5/1979  | Wakefield      |          |
| 4,227,291 | A |   | 10/1980 | Schumacher     |          |
| 4,288,214 | A | * | 9/1981  | Harman         | 432/58   |
| 4,298,037 | A |   | 11/1981 | Schumacher et al. |       |
| 4,318,942 | A |   | 3/1982  | Woerner et al. |          |
| 4,341,610 | A |   | 7/1982  | Schumacher     |          |
| 4,393,013 | A |   | 7/1983  | McMenamin      |          |
| 4,418,650 | A | * | 12/1983 | Johnson et al. | 122/40   |
| 4,424,199 | A |   | 1/1984  | Iya            |          |
| 4,436,674 | A |   | 3/1984  | McMenamin      |          |

(Continued)

FOREIGN PATENT DOCUMENTS

EP 0320403 12/1988
EP 0462515 6/1991

(Continued)

OTHER PUBLICATIONS

Office Action dated Jun. 21, 2013 for U.S. Appl. No. 13/316,191.

(Continued)

*Primary Examiner* — Walter D Griffin
*Assistant Examiner* — Huy-Tram Nguyen
(74) *Attorney, Agent, or Firm* — Stoel Rives LLP

(57) ABSTRACT

A fluidized bed reactor system is disclosed. The system may be used in connection with a locally cooled gas distribution plate, which may control the reaction and increase system efficiency. A thermal bridge breaking system for disrupting heat transfer across the reactor is also disclosed. The thermal bridge breaking system may be provided in connection with, or separate from, the gas distribution plate cooling system.

30 Claims, 11 Drawing Sheets

(56) References Cited

U.S. PATENT DOCUMENTS

| | | |
|---|---|---|
| 4,691,866 A | 9/1987 | Belk |
| 4,806,317 A | 2/1989 | Boone et al. |
| 4,818,495 A | 4/1989 | Iya |
| 4,820,587 A | 4/1989 | Gautreaux et al. |
| 4,859,375 A | 8/1989 | Lipisko et al. |
| 4,883,687 A | 11/1989 | Gautreaux et al. |
| 4,891,201 A | 1/1990 | Schumacher |
| 4,900,411 A | 2/1990 | Poong et al. |
| 4,956,169 A | 9/1990 | Ajioka et al. |
| 4,979,643 A | 12/1990 | Lipisko et al. |
| 5,026,533 A | 6/1991 | Matthes et al. |
| 5,077,028 A | 12/1991 | Age |
| 5,139,762 A | 8/1992 | Flagella |
| 5,242,671 A | 9/1993 | Allen et al. |
| 5,284,676 A | 2/1994 | Accuntius et al. |
| 5,326,547 A | 7/1994 | Allen |
| 5,346,141 A | 9/1994 | Kim et al. |
| 5,374,413 A | 12/1994 | Kim et al. |
| 5,382,412 A | 1/1995 | Kim et al. |
| 5,445,742 A | 8/1995 | Almquist et al. |
| 5,516,345 A | 5/1996 | Brown |
| 5,776,416 A | 7/1998 | Oda |
| 5,798,137 A | 8/1998 | Lord et al. |
| 5,810,934 A | 9/1998 | Lord et al. |
| 5,849,969 A | 12/1998 | Heyse et al. |
| 5,866,743 A | 2/1999 | Heyse et al. |
| 5,910,290 A | 6/1999 | Hyppanen |
| 5,910,295 A | 6/1999 | DeLuca |
| 5,976,247 A | 11/1999 | Hansen et al. |
| 6,007,869 A | 12/1999 | Schreieder et al. |
| 6,060,021 A | 5/2000 | Oda |
| 6,465,674 B1 | 10/2002 | Kalchauer et al. |
| 6,541,377 B2 | 4/2003 | Kim et al. |
| 6,827,786 B2 | 12/2004 | Lord |
| 6,846,473 B2 | 1/2005 | Kirii et al. |
| 6,849,244 B2 | 2/2005 | Konig et al. |
| 6,852,301 B2 | 2/2005 | Block et al. |
| 6,932,954 B2 | 8/2005 | Wakamatsu et al. |
| 6,953,559 B2 | 10/2005 | Mieczko |
| 7,001,579 B2 | 2/2006 | Metzger |
| 7,029,632 B1 | 4/2006 | Weighaus et al. |
| 7,033,561 B2 | 4/2006 | Kendig et al. |
| 7,056,484 B2 | 6/2006 | Bulan et al. |
| 7,105,053 B2 | 9/2006 | Winterton et al. |
| 7,141,114 B2 | 11/2006 | Spangler |
| 7,414,166 B2 | 8/2008 | Beech, Jr. et al. |
| 7,462,211 B2 | 12/2008 | Beech, Jr. et al. |
| 7,462,341 B2 | 12/2008 | Hoel et al. |
| 7,490,785 B2 | 2/2009 | Weidhaus |
| 7,553,466 B2 | 6/2009 | Herold |
| 8,075,692 B2 | 12/2011 | Osborne et al. |
| 8,158,093 B2 | 4/2012 | Sanchez et al. |
| 8,540,818 B2 * | 9/2013 | Kirii et al. ............... 118/726 |
| 2002/0081250 A1 | 6/2002 | Lord |
| 2002/0086530 A1 | 7/2002 | Kim et al. |
| 2002/0187096 A1 | 12/2002 | Kendig et al. |
| 2003/0205328 A1* | 11/2003 | Kinnard et al. .......... 156/345.37 |
| 2004/0042950 A1 | 3/2004 | Mleczko et al. |
| 2004/0151652 A1 | 8/2004 | Herold et al. |
| 2006/0105105 A1 | 5/2006 | Ibrahim et al. |
| 2007/0217988 A1 | 9/2007 | Amendola |
| 2007/0248521 A1 | 10/2007 | Kutsovsky et al. |
| 2008/0020216 A1 | 1/2008 | Bagnoli et al. |
| 2008/0056979 A1 | 3/2008 | Arvidson et al. |
| 2008/0220166 A1 | 9/2008 | Ege et al. |
| 2008/0241046 A1 | 10/2008 | Hertlein et al. |
| 2008/0299015 A1 | 12/2008 | Lord |
| 2008/0299291 A1 | 12/2008 | Weidhaus |
| 2009/0047204 A1 | 2/2009 | Kim et al. |
| 2010/0098850 A1 | 4/2010 | Lord et al. |
| 2010/0111804 A1 | 5/2010 | Lord et al. |
| 2010/0112744 A1 | 5/2010 | Molnar |
| 2010/0215562 A1 | 8/2010 | Sanchez et al. |
| 2011/0027160 A1 | 2/2011 | Sanchez et al. |
| 2011/0158857 A1 | 6/2011 | Erk |
| 2011/0158888 A1 | 6/2011 | Erk |
| 2011/0244124 A1 | 10/2011 | Kulkarni et al. |

FOREIGN PATENT DOCUMENTS

| | | |
|---|---|---|
| EP | 1023932 | 8/2000 |
| EP | 1437327 | 7/2004 |
| JP | 63117906 | 5/1988 |
| JP | 06127922 | 5/1994 |
| WO | WO98/50143 | 11/1998 |
| WO | WO2005/085133 | 9/2005 |
| WO | WO2007/012027 | 1/2007 |
| WO | WO2007/035108 | 3/2007 |

OTHER PUBLICATIONS

'The Kinetics of Epitaxial Silicon Deposition by the Hydrogen Reduction of Chlorosilanes'. B.E. Bradshaw—Int. J. Electronics, vol. 21, No. 3, pp. 205-227, 1966.

'A Through Thermodynamic Evaluation of the Silicon-Hydrogen-Chlorine System'. L.P. Hunt, E. Sirtl—J. Electrochem. Soc., vol. 119, No. 12, pp. 1741-1745, Dec. 1972.

'High Temperature Reactions in the Silicon-Hydrogen-Chlorine System.' E. Sirtl, L.P. Hunt, D.H Sawyer—J. Electrochem. Soc., vol. 121, No. 7, pp. 919-925, Jul. 1974.

LSA Silicon Material Task Closed—Cycle Process Development—Interim Summary Report Aug.—JPL Contract No. 955006, Dec. 1978.

'Gas Phase Diffusion and Surface Reactions in the Chemical Vapour Deposition of Silicon'. J. Bloem—Pure & Appl. Chem, vol. 50, pp. 435-447, 1978.

'Frictional Behavior of Carbide Derived Carbon Films Synthesized on Tungsten Carbide in Moderately Humid Air and Dry Nitrogen'. Tlustochowicz, M., CLT Group Presentation, Jun. 22, 2001.

'Tribology of Carbide Derived Carbon Films Synthesized on Tungsten Carbide'. Tlustochowicz, M., Energy Systems Division, Argonne National Laboratory, 2009.

'Processes & Process Developments in Japan'. Toshio Noda, Osaka Titanium co. Ltd., pg. 213-231, Feb. 1986.

'Silicon Production in a Fluidized Bed Reactor: Final Report'. Rohatgi, N.K., Solar Array Project, Flat-Plate, Department of Energy, JPL Publication 86-17, Apr. 1986.

Gogotsi et al., 'Nano Porous Carbide-Derived Carbon with Tunable Pore Size'. Nature Materials, vol. 2, pp. 591-594, Sep. 2003.

Marra et al., 'Reactions of Silicon-Based Ceramics in Mixed Oxidation Chlorination Environments'. Journal of the American Ceramic Society, vol. 71 No. 12, pp. 1067-1073, Dec. 1988.

Ersoy et al., 'Carbon coatings Produced by High Temperature Chlorination of Silicon Carbide Ceramics'. Mat. Res. Innovat. 5: 55-62, 2001.

Landsberg et al., 'The Chlorination Kinetics of Tungsten Molybdenum and their Alloys'. J. Electrochem. Soc. Solid State Science, pp. 1331, 1336, Aug. 1971.

Lin, 'Mass Spectrometric Studies on High Temperature Reaction Between Hydrogen Chloride and Silica/Silicon'. Mass Spectrometric Studies, vol. 123 No. 4, pp. 512-514, Apr. 1976.

'Oxygen, Carbon & Nitrogen in Silicon'. Handbook of Semiconductor Silicon Technology, pp. 526-533. Dec. 1990.

Special Metals Incoloy® Alloy 825. Retrieved from http://www.matweb.com on Dec. 13, 2010.

Hastelloy® C2000® alloy. Haynes International, Inc. 2005.

International Search Report for PCT/US2009/065345 dated Sep. 2, 2010.

'Proceedings of the Flat-Plate Solar Array Project Workshop on Low-Cost Polysilicon for Terrestrial Photovoltaic Solar-Cell Applications'. Oct. 28-30, 1985 at Las Vegas, NV, Feb. 1986. Prepared for U.S. Department of Energy, through National Aeronautics by Jet Propulsion Laboratory, Pub. 86-11.

'Silicon Production in a Fluidized Bed Reactor: Final Report'. Apr. 1986. Prepared for U.S. Department of Energy, through National Aeronautics by Jet Propulsion Laboratory, Pub. 86-17.

Office Action dated Dec. 20, 2011 for U.S. Appl. No. 12/393,852.

Office Action dated May 5, 2011 for U.S. Appl. No. 12/393,852.

(56) References Cited

OTHER PUBLICATIONS

Office Action dated Dec. 16, 2010 for U.S. Appl. No. 12/393,852.
Office Action dated Jan. 18, 2012 for U.S. Appl. No. 12/903,994.
Notice of Allowance dated Feb. 15, 2012 for U.S. Appl. No. 12/903,994.
Office Action dated Sep. 22, 2010 for U.S. Appl. No. 12/393,852.
Office Action dated Aug. 10, 2011 for U.S. Appl. No. 12/903,994.
Notice of Allowance dated Mar. 14, 2012 for U.S. Appl. No. 12/393,852.
Restriction Requirement dated Apr. 12, 2012 for U.S. Appl. No. 13/420,074.
International Search Report and Written Opinion for PCT/US2011/023984 dated Jan. 11, 2012.
Office Action dated Jul. 24, 2012 for U.S. Appl. No. 13/420,074.
Office Action dated Dec. 19, 2012 for U.S. Appl. No. 13/420,074.
International Search Report and Written Opinion dated Mar. 5, 2014 for PCT/EP2013/064745.
'Report on Results of Contract Research and Development for Sunshine Product: Examination of Experimental Production of Low-Cost Silicon', NEDO Document and Material Room, Shin-Etsu Chemical Co. Ltd., Mar. 1981.
Office Action dated Sep. 10, 2013 for U.S. Appl. No. 12/964,331.
International Search Report dated May 3, 2014 for PCT/EP2013/064745.

\* cited by examiner

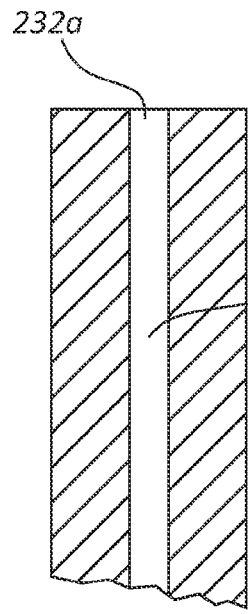 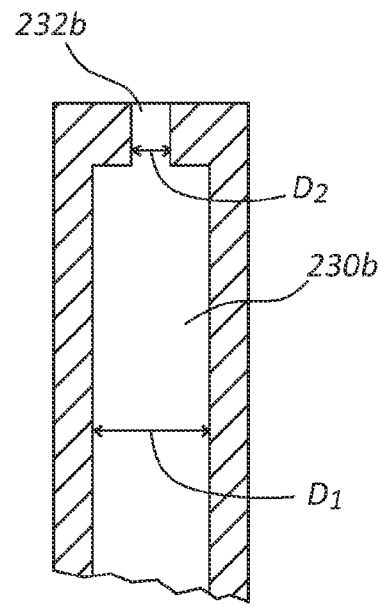
FIG. 6A  FIG. 6B
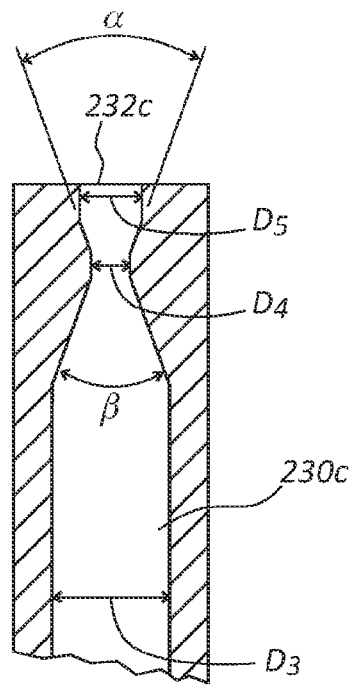
FIG. 6C

COOLED GAS DISTRIBUTION PLATE, THERMAL BRIDGE BREAKING SYSTEM, AND RELATED METHODS

TECHNICAL FIELD

The current disclosure relates to gas diffuser plates and other components that may be used in connection with fluidized bed reactor systems. In some embodiments one or more of the components may be partially cooled. For example, portions of a gas diffuser plate may be locally cooled to control gas reactions within the fluidized bed reactor.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

FIG. 6A is a side cross-sectional view of an embodiment of a gas injector.

FIG. 6B is a side cross-sectional view of another embodiment of a gas injector.

FIG. 6C is a side cross-sectional view of another embodiment of a gas injector.

DETAILED DESCRIPTION

Figure 1:
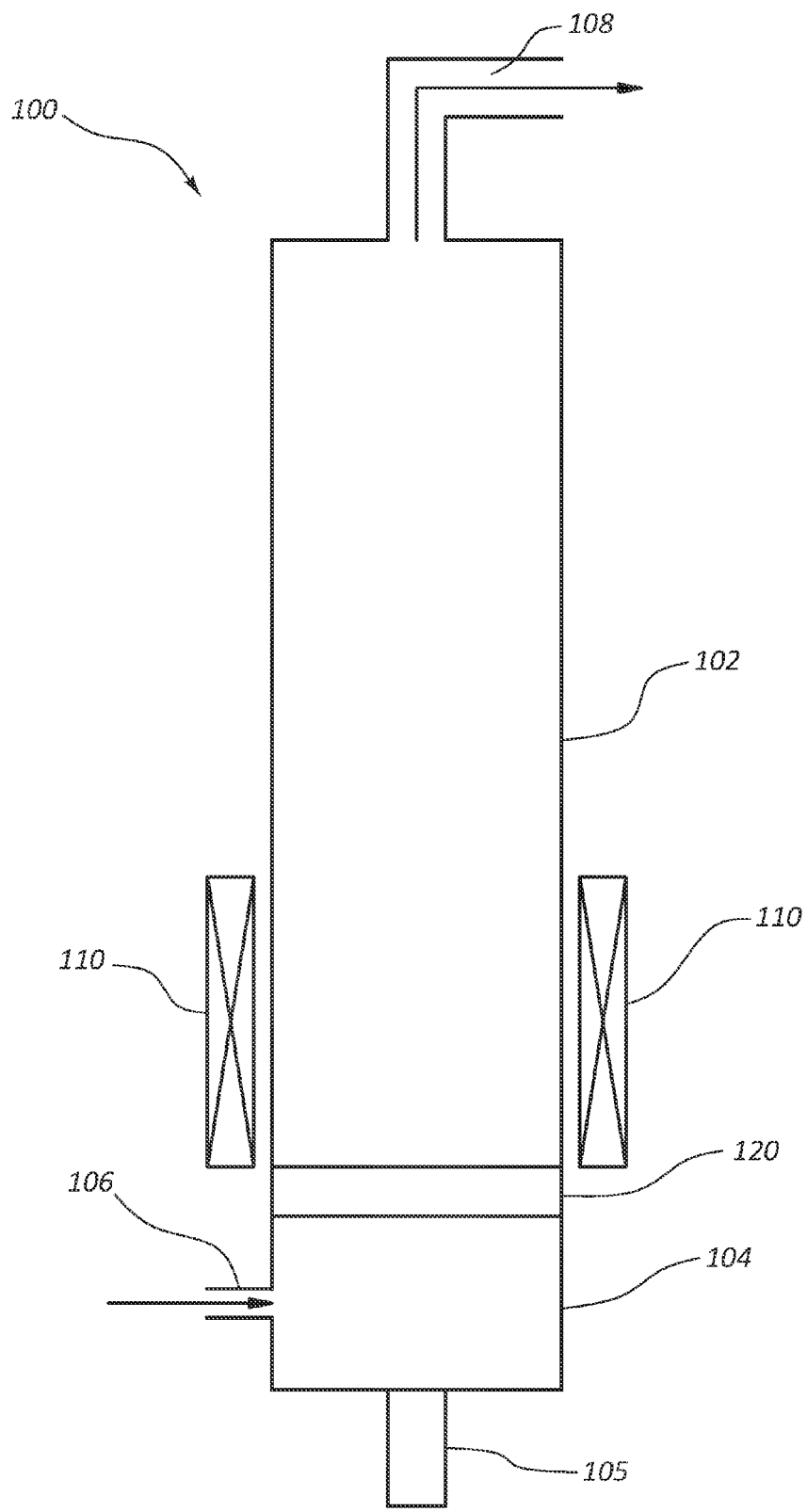
FIG. 1 is a schematic representation of a fluidized bed reactor.

Polycrystalline silicon may be used in the production of electronic components and solar panel construction. One method of producing polycrystalline silicon is the Siemens method and involves feeding a mixture comprising a silicon-bearing gas, such as hydrogen and silane ($SiH_4$), or a mixture comprising hydrogen and a halosilane, such as trichlorosilane ($HSiCl_3$), into a decomposition reactor. The gases are mixed inside the reactor and then decomposed onto the surface of a heated silicon filament or rod. The Siemens method requires a high amount of energy per unit of mass of produced silicon and has low productivity because of the limited surface area of the silicon filament or rod. Furthermore, the Siemens method is an inefficient batch process and the silicon rods produced by this method need further processing into smaller chunks or beads before they can be used.

Another method used for the production of silicon includes a fluidized bed process within a fluidized bed reactor. During silicon production according to a fluidized bed process, a gas mixture comprising, for example, a silicon-free gas, such as hydrogen, and a silicon-bearing gas, such as silane, trichlorosilane, halosilanes ($SiH_xY_z$ (F, Cl, Br, I)) may be added to a fluidized bed reactor having a fluidized bed of heated silicon particle seeds. The decomposition of silane, trichlorosilane, or a halosilane causes the deposition of elemental silicon onto the surface of the heated silicon particles seeds that then grow in size within the reaction chamber of the fluidized bed reactor. When the silicon particles are large enough, they are passed out of the fluidized bed reactor in a continuous process as a high-purity silicon product. In comparison to the Siemens method, silicon production with a fluidized bed process may be more efficient because it allows for a larger contact area between the silicon particles and the silicon-bearing gases, thereby enhancing the rate of thermal decomposition of the silicon-bearing gases on the surface of the silicon particles. Furthermore, a fluidized bed process dramatically reduces energy consumption during silicon production, utilizing approximately 10-15 kWh/kg of polysilicon, compared to the use of approximately 60-80 kWh/kg of polysilicon during the Siemens method, in some instances.

In some embodiments, a silicon-free gas, in addition to the silicon-bearing gas, may be fed into the reactor to control the fluidization ratio. The silicon-free gas may be mixed with the silicon-bearing gas prior to introduction into the fluidized bed reactor system. Examples of suitable silicon-free gases include, for example, hydrogen, nitrogen, argon, and mixtures thereof.

Fluidized bed reactors may be configured to introduce a fluidizing gas through a gas distribution plate. For example, a mixture of one or more silicon-bearing gases and one or more silicon-free gases may be introduced into a reaction chamber through a gas distribution plate.

In some instances, gas distribution plates may be prone to silicon deposition on portions of the distribution plate. For example, in some instances, hot portions of a gas distribution plate in communication with a reaction chamber may be prone to silicon deposition. In some instances, such silicon deposition may tend to partially or fully block gas injector orifices in the gas distribution plate. In some embodiments, the distribution plate may be cooled to reduce or avoid silicon deposition on the distribution plate. For example, cooling channels and a cooling fluid may be used to cool the gas distribution plate. However, cooling the gas distribution plate may result in undesirable thermal energy losses from the reaction chamber, thus reducing the efficiency of the overall process.

Furthermore, in some instances, use of cooled gas distribution plates may decrease the temperature of the bed of silicon particles within the reaction chamber near the gas distribution plate. Particularly in connection with the use of halosilanes, this may result in homogeneous, rather than heterogeneous deposition, which may, in turn, increase the ratio of silicon dust formation within the reaction chamber.

In some instances, nozzle-based designs may be used in place of gas diffuser plates to introduce gas into a reaction chamber. In some such designs, the gas itself may be cooled to below the decomposition temperature in order to limit unwanted silicon deposition. However, in cooled-gas systems, depositions may still form around the nozzle. Cooling the nozzles may reduce some such depositions, but may alter reactor conditions such that deposits are formed in other areas. Minimizing silicon deposition on or around nozzles may enable longer process runs that may increase the efficiency of the overall process.

Thus, to minimize wall deposits and dust, it may be desirable to maintain relatively high temperatures within the bed of silicon particles near the silicon-bearing gas inlet. In some embodiments of nozzle and/or gas distribution plate designs, this can be done by localizing the zone of cooled components only to areas where silicon deposition is to be avoided and minimizing cooling within the bed of silicon particles.

In some embodiments, this is done by locally cooling gas orifices, thereby reducing silicon deposition thereon and minimizing heat transfer from the reaction chamber. Additionally, cooling systems may be used in connection with any potentially localized hot areas of the plenum area of a fluidized bed reactor. In some instances, a component, such as a flange, is coupled to a wall of the reactor, which can create a thermal bridge between heated portions of the reaction chamber and the walls of the plenum. A localized cooling system can be configured to disrupt such thermal transfer between hot areas of a fluidized bed reactor and the plenum portion of the reactor.

Any of the components and examples disclosed herein may be relevant to systems and processes for distributing fluidization and reaction gases to a fluidized bed reactor to promote decomposition of the reaction gases and deposit silicon onto the surface of silicon beads or particles.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the disclosure, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

FIG. 1 is a schematic representation of a fluidized bed reactor 100. The fluidized bed reactor 100 of FIG. 1 comprises a reaction chamber 102 and a plenum 104. The reaction chamber 102 may be configured such that silicon beads disposed therein may be fluidized by injected gases (silicon-free and/or silicon-bearing gases) during operation of the fluidized bed reactor 100. A system gas inlet 106 may be configured to deliver gas to the reaction chamber 102. In the illustrated embodiment, the system gas inlet 106 delivers gas to the plenum 104, which gas subsequently passes into the reaction chamber 102. As described above, in some embodiments, silicon-bearing gases such as silane, trichlorosilane, or other halosilanes $SiH_xY_z$ (F, Cl, Br, I) or mixtures thereof may be introduced through the system gas inlet 106. Further, in some embodiments a fluidizing gas, which may comprise a silicon-free gas, may also be introduced through the system gas inlet 106. Such fluidizing gases include hydrogen, helium, argon, nitrogen, hydrogen chloride, hydrogen bromide, and hydrogen iodide. Furthermore, certain gases may be utilized both as a fluidizing agent and a silicon-bearing agent (as these gases tend to react less than the silicon-bearing gases listed above). Such gases include silicon tetrachloride, silicon tetrabromide, and silicon tetraiodide. Any combination of any number of silicon-bearing and fluidizing gases may be used in any example or embodiment disclosed herein.

In the illustrated embodiment, a gas distribution plate 120 is disposed between the plenum 104 and the reaction chamber 102. The gas distribution plate 120 may be configured to allow and/or control passage of gas from the plenum 104 to the reaction chamber 102. For example, the gas distribution plate 120 may be configured with openings to allow gas flow across the gas distribution plate.

The illustrated embodiment further comprises heaters 110 configured to maintain suitable reaction temperatures within the reaction chamber 102. The illustrated heaters 110 are schematic in nature; it is within the scope of this disclosure for any number of heaters to be placed at various locations. The heaters 110 may be radiant, conductive, electromagnetic, infrared, or any other type of heater. The heaters 110 may be placed around the entire circumference of the reaction chamber 102 or only around a portion of the reaction chamber. The heaters 110 may be in partial or total contact with an exterior wall of the reaction chamber 102 or may have no direct contact with the exterior wall. In some embodiments, the reaction chamber 102 may be heated to temperatures from about 500° C. to about 1200° C. during operation of the fluidized bed reactor 100. In some embodiments, the heaters 110 may be configured such that silicon beads, silicon-bearing gases, and fluidizing gases within the reaction chamber 102 are heated to temperatures ranging from about 600° C. to 1100° C., from about 700° C. to about 1000° C., from about 750° C. to about 850° C., or from about 800° C. to about 1000° C.

The fluidized bed reactor 100 may be configured to withstand conditions during the decomposition reaction including temperatures ranging from approximately 500° C. to approximately 1200° C. and internal pressures ranging from approximately 50 mbar to approximately 6000 mbar. For example, the fluidized bed reactor 100 as described herein may be constructed to withstand pressures of approximately up to 50 mbar, 100 mbar, 200 mbar, 500 mbar, 750 mbar, 1000 mbar, 1500 mbar, 2000 mbar, 2500 mbar, 3000 mbar, 3500 mbar, 4000 mbar, 4500 mbar, 5000 mbar, 5500 mbar, and 6000 mbar. In another embodiment, the fluidized bed reactor 100 may be contained within another structure or enclosure configured to support pressures ranging from approximately 50 mbar to approximately 6000 mbar.

In one embodiment, one or more silicon-bearing gases, such as trichlorosilane, is injected into the fluidized bed reactor 100. For example, the silicon-bearing gas may be injected into the reaction chamber 102 from the plenum 104, passing through the gas distribution plate 120. In one such embodiment, a silicon-bearing gas, like trichlorosilane, decomposes to form silicon on the beads, increasing the diameter of the beads over time until they become a silicon product bead. In still another embodiment, the silicon-bearing gas comprises a gas that decomposes when heated to form silicon and a gas or a mixture of gases selected from at least one of the following: monosilane, disilane, trisilane, trichlorosilane, dichlorosilane, monochlorosilane, tribromosilane, dibromosilane, monobromosilane, triiodosilane, diiodosilane, and monoiodosilane.

In one embodiment silicon beads inside the reaction chamber 102 are fluidized by the gases mentioned in the previous paragraph to ensure a fluidization ratio from about $2 \times U_{mf}$ to about $6 \times U_{mf}$, including from about $2.5 \times U_{mf}$ to about $5.5 \times U_{mf}$, and from about $3.5 \times U_{mf}$ to about $4.5 \times U_{mf}$. Such ratios may ensure a proper degree of agitation of the particles, avoiding the formation of agglomerates. The minimum fluidization velocity ($U_{mf}$) defines the limit where the silicon beads begin to be fluidized. When the superficial gas velocity U reaches the value of $U_{mf}$, the silicon particles move from a condition of packed bed to a condition where particles are supported by the gas flow. It is the point where the equilibrium between gravitational forces and drag forces is reached. The minimum fluidization velocity depends on gas and particle properties. There are many correlations to determine the minimum fluidization velocity in a fluidized bed. Wen & Yu correlation [1966] is used to determine the minimum fluidization velocity:

$$U_{mf} = \frac{\mu_g}{d_{psv} \cdot \rho_g} \cdot \left( \sqrt{C_1^2 + C_2 \cdot Ar} - C_1 \right)$$

Where, C1 and C2 are constants empirically adjusted and Ar is the Archimedes number that is defined by the following expression:

$$Ar = \frac{d_{psv} \cdot \rho_g \cdot (\rho_p - \rho_g) \cdot g}{\mu_g^2}$$

In one embodiment, the high purity silicon product that is in the form of dust and fines is recovered from the fluidized bed reactor 100 near the top of the reaction chamber 102 at a system gas outlet 108 along with an effluent gas stream that may include hydrogen, $SiCl_4$, HCl, and/or unreacted trichlorosilane, monochlorosilane, and/or dichlorosilane. Additionally, in some embodiments, the concentration of silicon-bearing gases introduced into the fluidized bed reactor 100 at the system gas inlet 106 ranges from 20 mol % to 100 mol %.

In one such embodiment, the average diameter of the fluidized silicon beads ranges from 0.5 mm to 4 mm. In another embodiment, the average diameter of the beads ranges from 0.25 mm to 1.2 mm, or alternatively 0.6 mm to 1.6 mm. The minimum fluidization velocity and design operational velocity may be determined by one of ordinary skill in the art, having the benefit of this disclosure, based on various factors. The minimum fluidization velocity may be influenced by factors including gravitational acceleration, fluid density, fluid viscosity, solid density, and solid particle size. The operational velocity may be influenced by factors including heat transfer and kinetic properties, such as height of the fluidized bed, total surface area, flow rate of silicon precursor in the feed gas stream, pressure, gas and solids temperature, concentrations of species, and thermodynamic equilibrium point.

In one embodiment, the wall of the reaction chamber 102 is configured to be thermoresistant to temperatures in the range of approximately 500° C. to 1200° C. For example, the wall of the reaction chamber 102 can be constructed to tolerate temperatures ranging from approximately 500° C. to 600° C., from 500° C. to 700° C., from 600° C. to 800° C., from 800° C. to 900° C., from 800° C. to 1000° C., from 900° C. to 1100° C., or from 900° C. to 1200° C. In one embodiment, the inside surface of the wall of the reaction chamber 102 may be partially or completely lined with a protective layer to avoid or minimize the contamination of the product beads by diffusion of impurities from the fluidized bed reactor 100 or the wall of the reaction chamber 102. In one such embodiment, the protective layer comprises materials that are inert or resistant to the conditions in the reaction chamber 102. For example, the protective layer may comprise materials that are resistant to heat, pressure, and corrosion by the fluidizing gases or the silicon-bearing gases that are injected into the fluidized bed reactor 100.

In one embodiment, the fluidized bed reactor 100 is lined with a protective layer comprising a ceramic material that is resistant to corrosion or breakdown by the conditions in the reaction chamber 102. In one such embodiment, the protective layer comprises at least one of the following materials: alumina ($Al_2O_3$), zirconium dioxide ($ZrO_2$), and zirconium dioxide-yttrium stabilized. In another embodiment, the protective layer comprises a ceramic material made from a composition other than one that is silicon-based or carbon-based. In yet another embodiment, the protective layer comprises at least one of alumina ($Al_2O_3$), zirconium dioxide ($ZrO_2$), and zirconium dioxide-yttrium stabilized in combination with at least one of polycrystalline silicon, silicon carbide, silicon carbide coated graphite, silica, silicon nitride, tungsten carbide, or molybdenum. In still another embodiment, the fluidized bed reactor 100 includes at least one of alumina ($Al_2O_3$), zirconium dioxide ($ZrO_2$), and zirconium dioxide-yttrium stabilized in combination with one of quartz, graphite, carbon fiber, silicon carbide, or combinations thereof.

The fluidized bed reactor 100 of FIG. 1 further comprises a silicon recovery outlet 105 that may be configured to allow silicon beads to be removed from the reaction chamber 102 during operation. In some embodiments, the silicon recovery outlet 105 extends from below the fluidized bed reactor 100 through the plenum 104 and gas distribution plate 120 to a lower portion of the reaction chamber 102. For example, silicon beads disposed within the reaction chamber 102 may become progressively larger and heavier as silicon is deposited thereon during operation of the fluidized bed reactor 100. Larger and/or heavier silicon beads may migrate to the lower portion of the reaction chamber 102 and eventually be recovered through the silicon recovery outlet 105.

As described above, in some embodiments, a fluidized bed reactor 100 comprises a plenum 104 and a reaction chamber 102. A gas distribution plate 120 may be disposed between the plenum 104 and the reaction chamber 102 and may be configured to control gas flow from the plenum 104 to the reaction chamber 102. The fluidized bed reactor 100 may be configured such that the plenum 104 receives silicon-bearing and/or fluidizing gases through the system gas inlet 106. The gas mixture may then pass through the gas distribution plate 120 into the reaction chamber 102 such that the gas mixture fluidizes silicon beads within the reaction chamber 102. Decomposition of the silicon-bearing gases and deposition on the silicon beads may then occur in the reaction chamber 102.

As also described in connection with additional embodiments below, in some embodiments the gas distribution plate 120 is coupled to other components of the fluidized bed reactor 100 through welds or other permanent joining methods. In other embodiments, the gas distribution plate 120 is coupled to the fluidized bed reactor 100 through a removable joint, such as a flange and bolts, clamp bolts, clamps, or other fasteners. In some embodiments, the reaction chamber 102 is coupled to, or integrally formed with, an upper flange and the plenum 104 coupled to, or integrally formed with, a lower flange. A portion of the gas distribution plate 120 may be disposed between the upper and lower flanges, and the entire assembly coupled with bolts or other fasteners.

Figure 2:
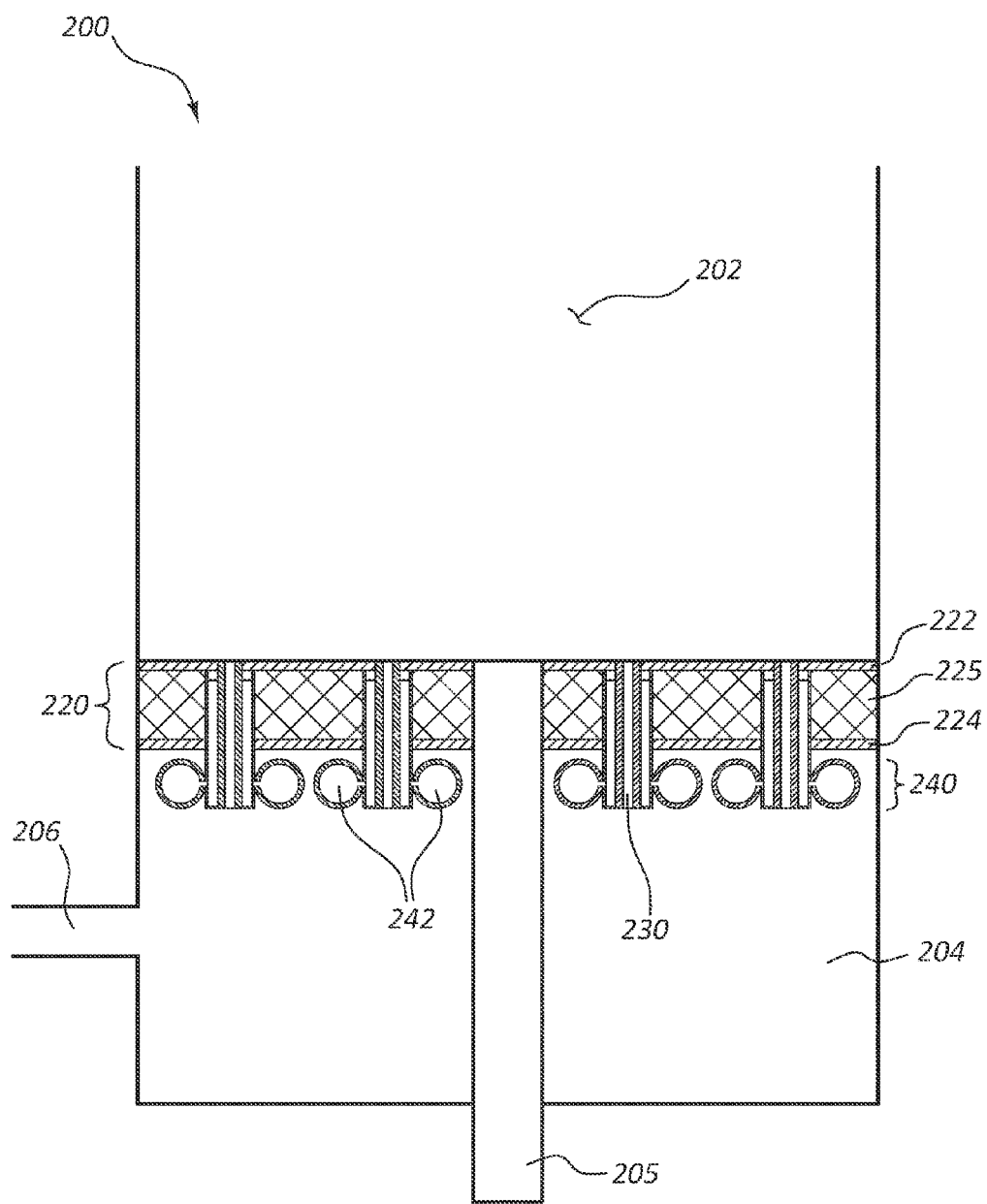
FIG. 2 is a schematic view of one embodiment of a fluidized bed reactor that comprises a cooled gas distribution plate.

FIG. 2 is a cross-sectional view of another embodiment of fluidized bed reactor 200 that can, in certain respects, resemble components of the fluidized bed reactor 100 described in connection with FIG. 1 above. It will be appreciated that all the illustrated embodiments may have analogous features. Accordingly, like features are designated with like reference numerals, with the leading digits incremented to "2." (For instance, the fluidized bed reactor is designated "100" in FIG. 1, and an analogous fluidized bed reactor is designated as "200" in FIG. 2.) Relevant disclosure set forth above regarding similarly identified features thus may not be repeated hereafter. Moreover, specific features of the fluidized bed reactor and related components shown in FIG. 2 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the fluidized bed reactor of FIG. 2. Any suitable combination of the features, and variations of the same, described with respect to the fluidized bed reactor and components illustrated in FIG. 1 can be employed with the fluidized bed reactor and components of FIG. 2, and vice versa. This pattern of disclosure applies equally to further embodiments depicted in subsequent figures and described hereafter.

FIG. 2 is a schematic view of one embodiment of a fluidized bed reactor 200 that comprises a cooled gas distribution plate 220. In the illustrated embodiment, a system gas inlet 206, a plenum 204, and a reaction chamber 202 are shown. Further, a silicon recovery outlet 205 extends to the lower portion of the reaction chamber 202. Gas injectors 230 extend through the distribution plate 220, providing fluid communication across the distribution plate 220 between the plenum 204 and the reaction chamber 202.

The distribution plate 220 of FIG. 2 comprises an upper plate 222 and a lower plate 224 with an insulated portion 225 disposed between the upper 222 and lower 224 plates. The insulated portion 225 may be configured to provide a degree of thermal isolation between the reaction chamber 202 and the plenum 204. In some embodiments, the insulated portion 225 may be configured to prevent heat transfer between the heated reaction chamber 202 and the plenum 204. This may be configured to prevent the temperature in the plenum 204 from reaching the decomposition temperature of the silicon-bearing gas, and thus prevent premature decomposition.

The distribution plate 220 may also be configured with a cooling system 240 configured to locally cool a small area around the gas injectors 230. Such cooling may prevent silicon deposition or buildup around or within the gas injectors 230. Prevention of such silicon deposition may facilitate longer run cycles of the fluidized bed reactor 220, and thus facilitate increased efficiency. The cooling system 240 may comprise a plurality of cooling channels 242 configured to circulate cooling fluid and thus cool particular portions of the distribution plate 220.

Figure 3:
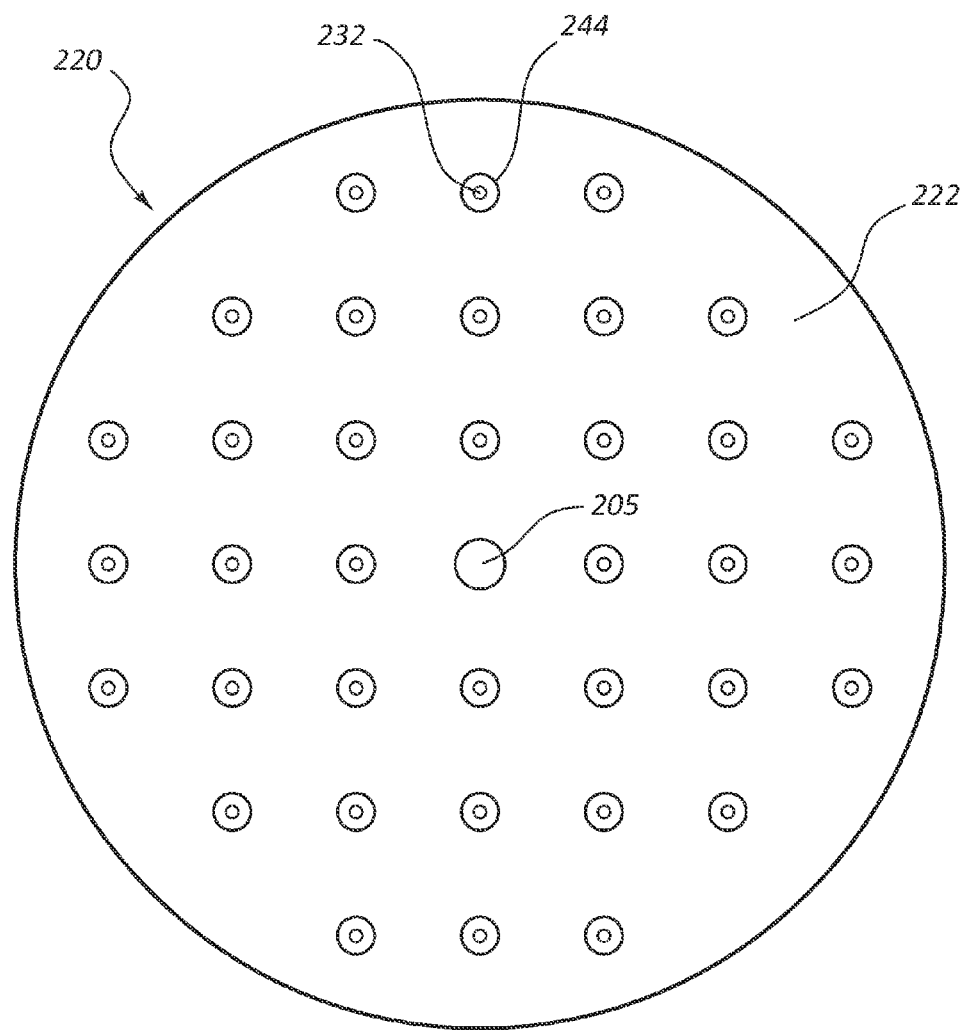
FIG. 3 is a top schematic view of the cooled gas distribution plate of FIG. 2.

FIG. 3 is a top schematic view of the cooled gas distribution plate 220 of FIG. 2. FIG. 3 illustrates a plurality of orifices 232 in the upper plate 222 of the gas distribution plate 220. Referring to both FIGS. 2 and 3, the orifices 232 provide fluid communication between the reaction chamber 202 and the plenum 204 through the gas injectors 230 of FIG. 2. The cooling system 240 may be configured to circulate cooling fluid such that a portion of the upper plate 222 adjacent each orifice is locally cooled. In some embodiments, a locally cooled zone 244 may be disposed around each of the orifices 232 like a ring. FIG. 3 further illustrates a portion of the silicon recovery outlet 205 extending through the upper plate 222.

Figure 4:
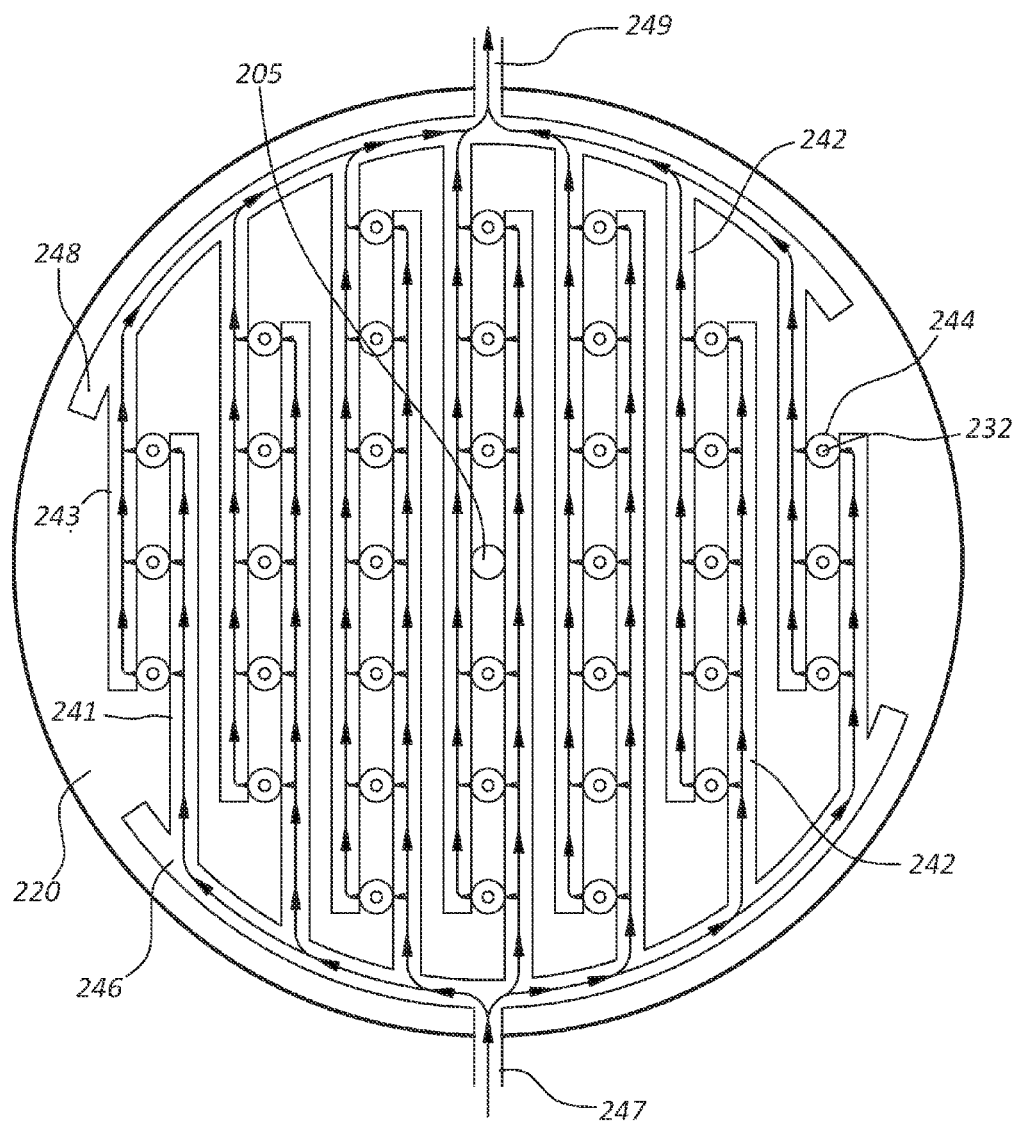
FIG. 4 is a schematic view of the cooled gas distribution plate of FIG. 3, illustrating an exemplary cooling fluid flow path.

FIG. 4 is a schematic view of the cooled gas distribution plate 220 of FIG. 3, illustrating an exemplary arrangement of cooling channels 242. The view of FIG. 4 is exemplary in nature, illustrating possible cooling channels 242 and potential flow paths (as indicated by the arrows) around the distribution plate 220. A wide variety of cooling channel 242 arrangements is within the scope of this disclosure. In the exemplary embodiment, cooling fluid may be supplied to the system by a cooling fluid inlet 247 and carried out of the system by a cooling fluid outlet 249. Cooling fluid may be distributed to supply cooling channels 241 through a supply manifold 246. The supply cooling channels 241 function as part of cooling channels 242, which are configured to provide cooling fluid flow to the locally cooled ring zones 244. Return cooling channels 243 may also be provided as part of cooling channels 242 configured to facilitate cooling fluid flow away from the locally cooled ring zones 244. The return cooling channels 243 may provide flow to a return cooling fluid header 248 then to the cooling fluid flow outlet 249. Orifices 232 and the silicon recovery outlet 205 are further illustrated in FIG. 4.

Figure 5:
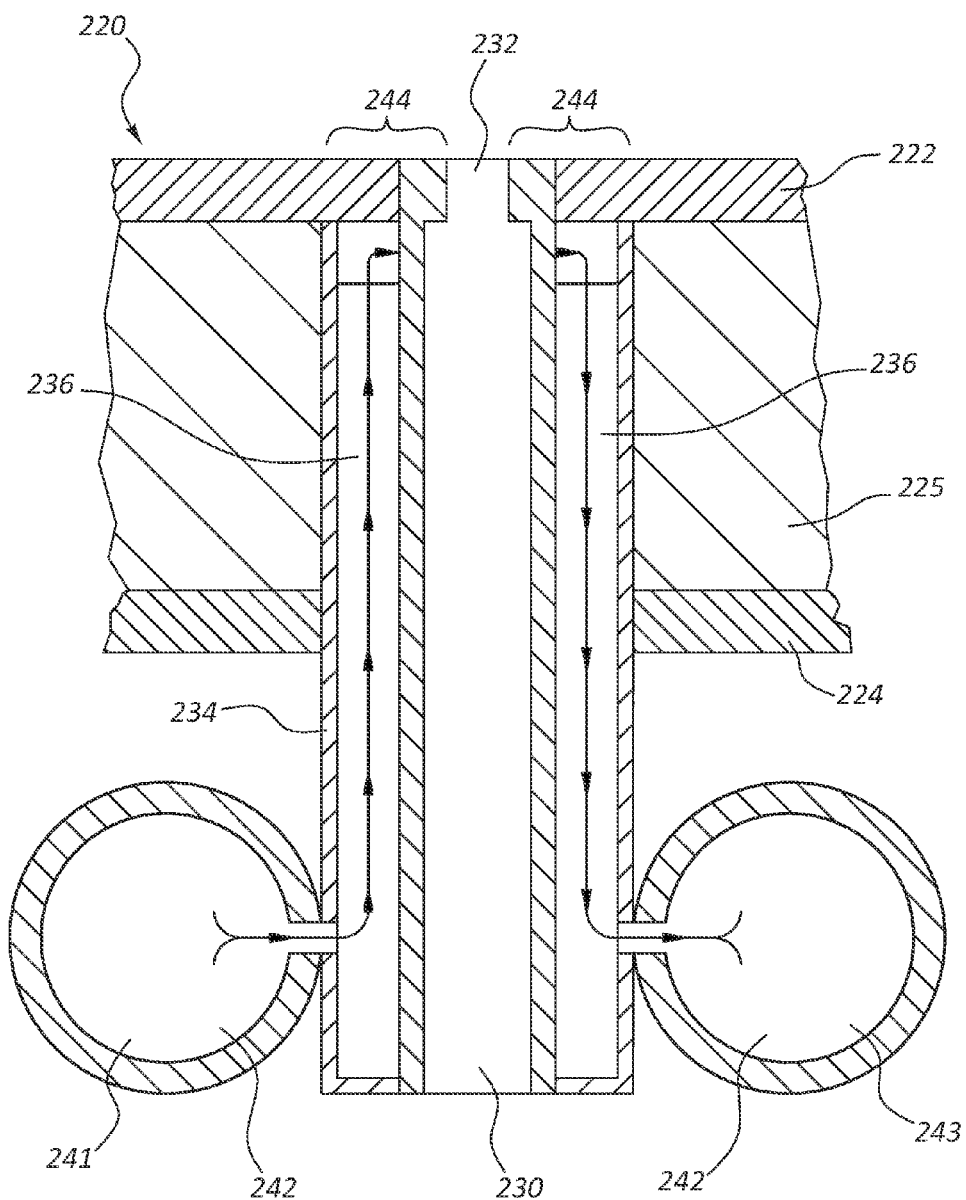
FIG. 5 is a detail view of a gas injector of the gas distribution plate of FIG. 2.

FIG. 5 is a detail view of a gas injector 230 of the gas distribution plate 220 of FIG. 2. The illustrated embodiment shows a portion of the upper plate 222, insulated portion 225, and lower plate 224 of the gas distribution plate 220. The gas injector 230 is shown extending through the gas distribution plate 220 to an orifice 232 in the upper plate 222. Further, a portion of the cooling channels 242, including a supply cooling channel 241 and a return cooling channel 243, is shown. Further, the gas injector 230 may further comprise a jacket 234 configured to contain cooling fluid around the gas injector 230. Further, in some embodiments, the jacket 234 is provided in connection with a baffle 236 configured to direct the cooling fluid with sufficient velocity to cool the gas injector 230 as well as the locally cooled ring zone 244 around the orifice 232.

FIGS. 6A-6C are side cross-sectional views of embodiments of gas injectors 230a, 230b, 230c for use in connection with a gas distribution plate, such as 220 of FIG. 2. In the embodiment of FIG. 6A, the gas injector 230a has a constant diameter along the length of the gas injector 230a that corresponds to the diameter of the orifice 232a. In the embodiment of FIG. 6B, the gas injector 230b has a first diameter $D_1$ along the length of the gas injector 230b and a second diameter $D_2$ at the orifice 232b. In the illustrated example, $D_1$ is larger than $D_2$. A gas injector such as 230b may be configured to minimize gas pressure drop along the length of the injector, while causing a pressure drop in the smaller diameter portion. In some embodiments, the pressure drop is between about 0.2 and about 2.0 times the pressure drop of a fluidized reactor bed, or the pressure drop within the reactor caused by gases flowing through bed particles.

FIG. 6C illustrates an embodiment of a gas injector 230c having three diameters: $D_3$, $D_4$, and $D_5$. In the illustrated embodiment, $D_3>D_5>D_4$. $D_3$ may be configured to minimize pressure drop along the length of the gas injector 230c, while $D_4$ causes a pressure drop between about 0.2 and 2.0 times the pressure drop of a fluidized reactor bed. Finally, $D_5$ may be configured to create sufficient jet penetration and kinetic energy to obtain a desired attrition effect, or the effect of particles colliding with each other, creating smaller fragments which become seeds for further growth. Further, the embodiment of FIG. 6C may be configured to provide sufficient pressure drop to avoid solid backflow, or silicon particles flowing back through the injector. Moreover, the pressure drop across injector 230 may improve the mixing of silicon-bearing and fluidizing gases within the plenum. As indicated above, this pressure drop may between about 0.2 and 2.0 times the pressure drop of a fluidized reactor bed, including between about 0.5 and 1.25 times. Additionally, injector 230c may be configured with two angles, α and β, between the diameters. These angles may be configured to influence or control flow distribution within and from the gas injector 230c. In some embodiments, each or either of these angles may be between about 10 degrees and about 70 degrees, including from about 20 degrees to about 60 degrees or from about 30 degrees to about 50 degrees.

Figure 7:
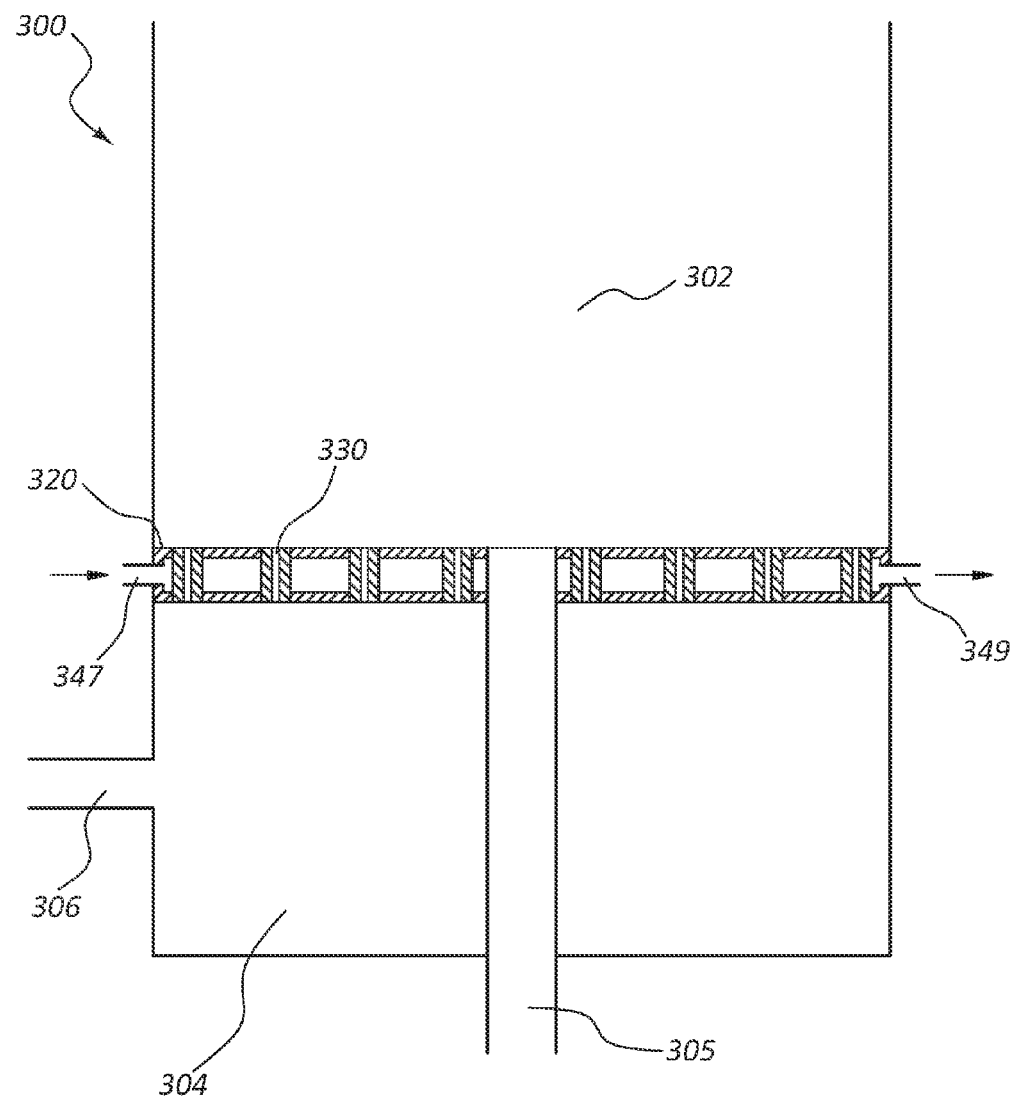
FIG. 7 is a schematic view of one embodiment of a fluidized bed reactor that comprises a fully cooled gas distribution plate.

FIG. 7 is a schematic view of one embodiment of a fluidized bed reactor 300 that comprises a fully cooled gas distribution plate 320. The fluidized bed reactor 300 of FIG. 7 also comprises a reaction chamber 302, a plenum 304, a system gas inlet 306, and a silicon recovery outlet 305. The fully cooled gas distribution plate 320 comprises gas injectors 330 and a cooling system comprising a cooling fluid inlet 347 and a cooling fluid outlet 349. As compared to the locally cooled gas distribution plate (220) of FIG. 2, the fully cooled gas distribution plate 320 of FIG. 7 has no insulated portion. Instead, cooling fluid flows from the cooling fluid inlet 347, around each gas injector 330, and contacts both the upper and lower surfaces of the gas distribution plate 320.

Figure 8:
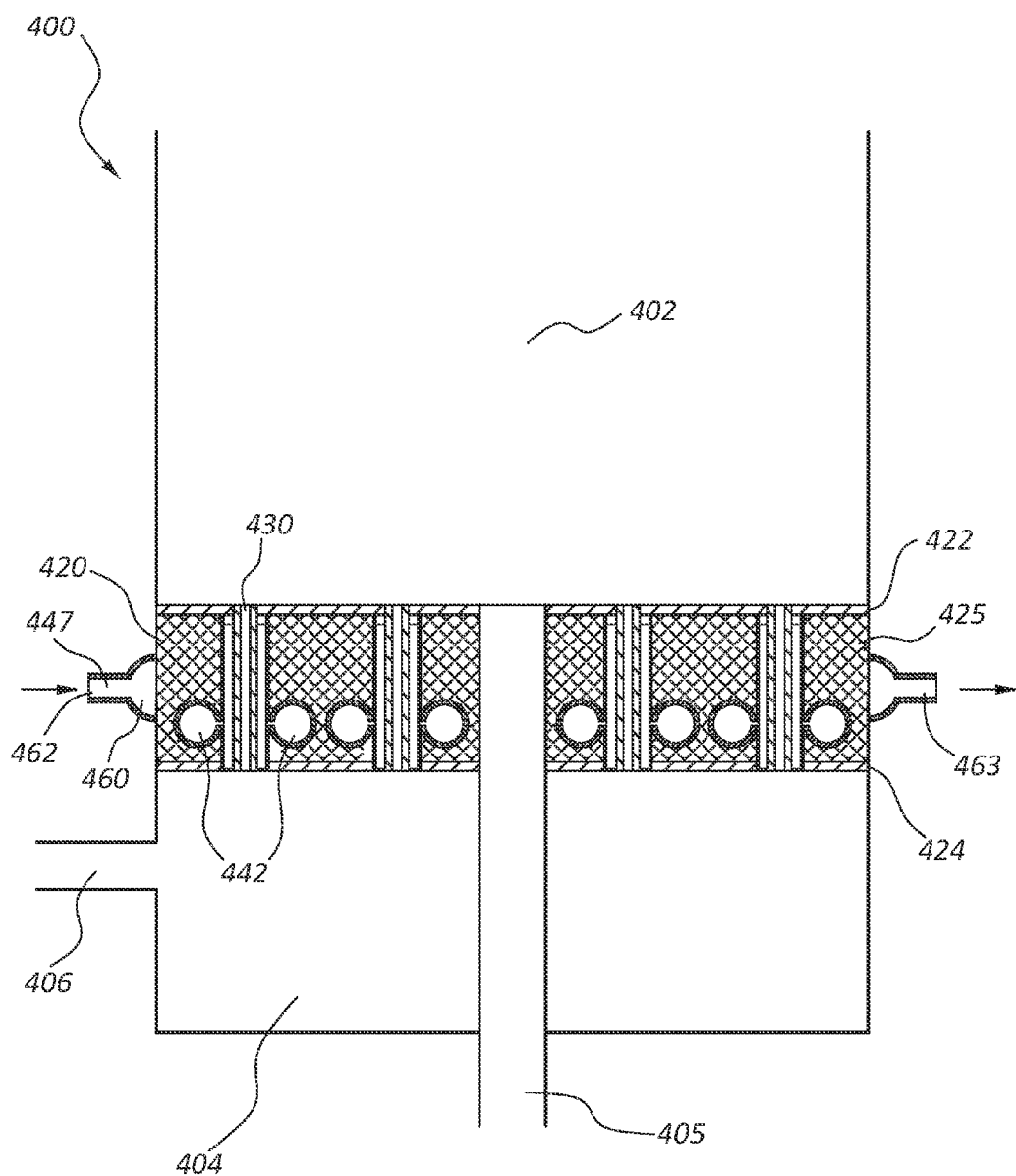
FIG. 8 is a schematic view of another embodiment of a fluidized bed reactor that comprises a locally cooled gas distribution plate and a thermal bridge breaking system.

FIG. 8 is a schematic view of another embodiment of a fluidized bed reactor 400 that comprises a locally cooled gas distribution plate 420. The fluidized bed reactor 400 of FIG. 8 also comprises a reaction chamber 402, a plenum 404, a system gas inlet 406, and a silicon recovery outlet 405. The gas distribution plate 420 of FIG. 8 comprises an upper plate 422, a lower plate 424, and an insulated portion 425 disposed between the upper 422 and lower 424 plates. Gas injectors 430 extend through the gas distribution plate 420.

The gas distribution plate 420 is locally cooled in an analogous manner to the gas distribution plate 220 of FIG. 2. Analogous to the system of FIG. 2, the gas distribution plate 420 of FIG. 4 comprises cooling channels 442 configured to distribute cooling fluid within and around the gas distribution plate 420. Cooling fluid distribution and delivery systems such as those shown and disclosed in connection with FIGS. 2-5 may likewise be used in connection with the system of FIG. 8 or any other system disclosed herein.

Differing from the system of FIG. 2 wherein the cooling channels 242 were disposed below the lower plate 224, the cooling channels 442 of the local cooling system of FIG. 4 are disposed within the insulated portion 425. Such a configuration may reduce or diminish stagnant areas within the plenum 404. In other words, a configuration with a uniform lower plate 224 surface (without cooling channels extending therefrom) may create a gas flow pattern within the plenum which may reduce the tendency of gases within the plenum from stagnating or reaching low velocities, as compared to a configuration having a less uniform surface.

As also discussed above, in some embodiments components of the fluidized bed reactor 400 may create a thermal bridge between hot components and components at lower temperatures. For example, the walls of the reaction chamber 402 may be much hotter than the walls of the plenum 404, as the reaction chamber 402 is heated to the gas decomposition temperature while the plenum 404 may be kept below this temperature. Heat transfer from the walls of the reaction chamber 402 to the walls of the plenum 404 may therefore be undesirable in some embodiments. The fluidized bed reactor 400 of FIG. 4 further comprises a thermal bridge breaking system 460, which may comprise a wall cooling system, for example. The wall cooling system 460 may comprise a wall cooling fluid inlet 462 and a wall cooling system outlet 463, while also providing wall cooling fluid flow around the fluidized bed reactor 400 configured to disrupt heat transfer from the walls of the reaction chamber 402 to the walls of the plenum 404. This thermal bridge breaking system may be configured to prevent temperatures above the gas decomposition temperature in the plenum 404 of the fluidized bed reactor 400. In the embodiment of FIG. 8, this cooling system is disposed around the gas distribution plate 420 and not in direct contact with either the reaction chamber 402 wall or the plenum 404 wall.

Figure 9:
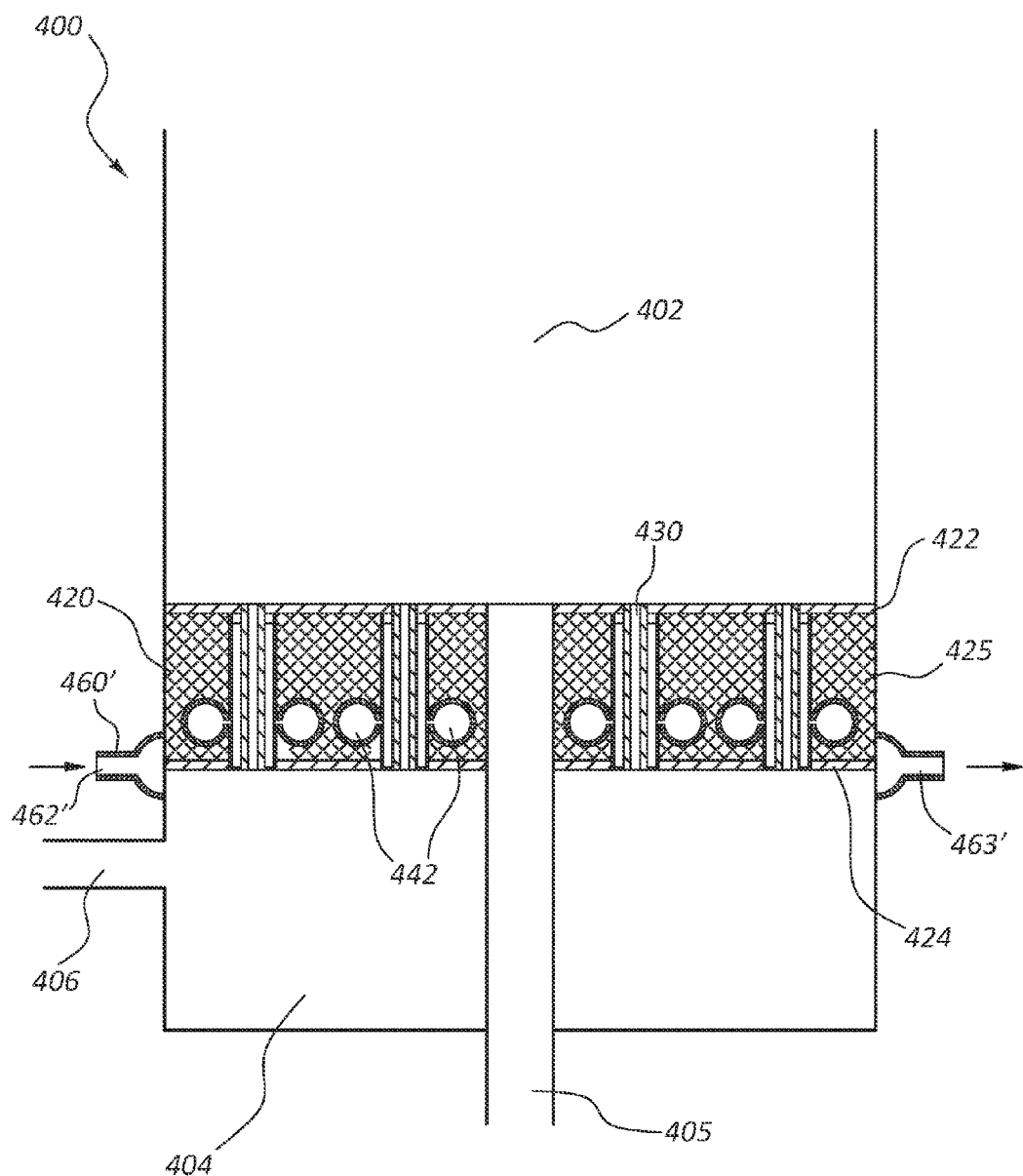
FIG. 9 is a schematic view of the fluidized bed reactor of FIG. 8 with the thermal bridge breaking system disposed in an alternative location.

FIG. 9 is a schematic view of the fluidized bed reactor 400 of FIG. 8 with the thermal bridge breaking system 460' disposed in an alternative location. Many of the same components illustrated in FIG. 8 are also shown in FIG. 9, indicated by the same reference numerals. In contrast with FIG. 8, in FIG. 9 the thermal bridge breaking system (460 of FIG. 8, 460' of FIG. 9) is positioned in an alternative location. In the embodiment of FIG. 9, the thermal bridge breaking system 460' surrounds both the gas distribution plate 420 and a portion of the wall of the plenum 404. As with the thermal bridge breaking system of FIG. 8, the thermal bridge breaking system of FIG. 9 may be configured to disrupt heat transfer from the reaction chamber 402 to the plenum 404.

Figure 10:
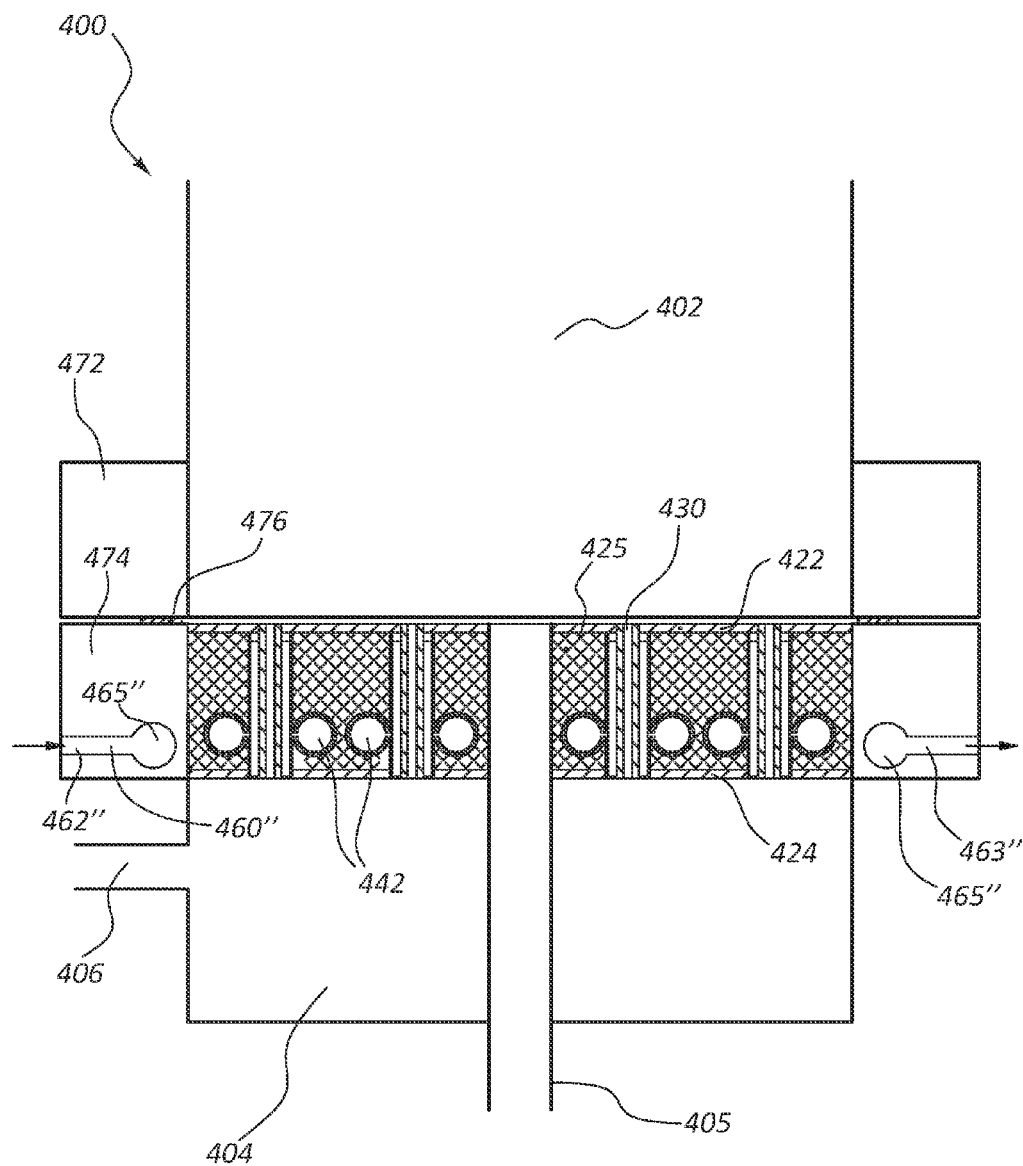
FIG. 10 is a schematic view of the fluidized bed reactor of FIG. 8 with alternative coupling and thermal bridge breaking systems.

FIG. 10 is a schematic view of the fluidized bed reactor 400 of FIG. 8 with alternative coupling and thermal bridge breaking systems. Many of the same components illustrated in FIGS. 8 and 9 are also shown in FIG. 10, indicated by the same reference numerals. In contrast with FIGS. 8 and 9, in FIG. 10 the reaction chamber 402 is coupled to the plenum 404 through use of an upper flange 472 and a lower flange 474. A gasket 476 may be disposed between the upper 472 and lower 474 flanges to seal the fluidized bed reactor 400. As also discussed above, the upper 472 and lower 474 flanges may be coupled through use of bolts, clamps, or other fasteners.

In the embodiment of FIG. 10, a thermal bridge breaking system 460" is provided in connection with the upper 472 and lower 474 flanges. In the illustrated embodiment, the thermal bridge breaking system 460" comprises a flange cooling fluid inlet 462" and a flange cooling fluid outlet 463". In some embodiments, this system is configured to disrupt heat transfer through the upper 472 and lower flanges 474. In particular, the system may be configured to compensate for increased heat transfer that may result from a larger contact area between the reaction chamber 402 wall and the plenum 404 due to the presence of the flanges 472, 474 or from the tendency of the flanges 472, 474 to store thermal energy due to their mass. As discussed in connection with FIGS. 8 and 9, however, thermal bridge breaking systems may also be used in connection with fluidized bed reactors that have no large coupling portion such as a flange.

In the embodiment of FIG. 10 the thermal bridge breaking system 460" may be disposed in the lower flange 474. In particular, in the illustrated embodiment, a flange cooling channel 465" is disposed within the lower flange 474. This placement may be configured to disrupt heat transfer across the flanges 472, 474 while avoiding unnecessary cooling of the reaction chamber 402. In other embodiments, the flange cooling channel 465" may alternatively be located in the upper flange 472.

In any of the embodiments discussed herein, cooling fluid used to cool the gas distribution plate may or may not be in fluid communication with cooling fluid used in connection with the thermal bridge breaking systems discussed above. In other words, these two systems may utilize the same fluid and be in fluid communication or may be entirely separate systems. Cooling fluid (for either system) may comprise water or thermal fluid; air, nitrogen, argon, or any mixture thereof; or tetrachorosilane, trichlorosilane, or mixtures thereof.

EXAMPLES

The specific examples included herein are for illustrative and exemplary purposes only and are not to be considered as limiting to this disclosure.

Example 1

Fully Cooled Gas Distribution Plate

To measure thermal losses in a fully cooled gas distribution plate, a fluidized bed reactor system with an inner diameter of 200 mm and 5 m height was used. The reactor was heated by an external heating system to a temperature of 900° C. A distributor plate with 13 orifices was positioned between the plenum and the reaction chamber of the fluidized bed reactor. The system was filled up with silicon granules with a particle size distribution average diameter (dp50%) of 1.700 microns, and a maximum diameter calculated as dp95% of 2.200 microns. Trichlorosilane and hydrogen were fed in a molar relation of 2:3 to achieve a fluidization regime of 3 times the minimum fluidization velocity calculated using the Wen & Yu equation described above. The gas distribution plate was similar to that shown and described in connection with FIG. 7. The cooling fluid was water at ambient temperature. Water mass flow and differential temperature from water inlet to water outlet were measured to obtain the cooling thermal power using the following equation:

$$Q = m^* c_p^* \Delta T$$

where:

Q is the value of thermal losses (kW);

m is the water mass flow (Kg/s);

$c_p$ is the specific heat at constant pressure of the water (kJ/Kg-° K); and

ΔT is the water temperature difference from the outlet to the inlet of the distributor plate (° K)

After 30 minutes at a temperature of 900° C. and the fluidization regime of 3 times the minimum fluidization velocity, the above mentioned parameters were measured and registered via an acquisition data system over 5 minutes, every 5 seconds. Later, a weighted mean of the equation above was done to determine the value of thermal losses due to the cooling system. The value of thermal loss was 13.1 kW.

Example 2

Locally Cooled Gas Distribution Plate

The procedure of Example 1 was followed using a locally cooled gas distribution plate (similar to that of FIG. 2) having four orifices. The measured thermal losses, as calculated in Example 1, due to the cooling system were 1.2 kW. Thus, the thermal losses of Example 2 were less than one-tenth those of the fully cooled gas distribution plate losses shown in Example 1.

In both Example 1 and Example 2, no wall deposits were found on and around the orifices of the gas distribution plates.

Example 3

Computer Simulation

Example 3 is a comparison of particle reheating between a reactor with a fully cooled distribution plate and another one with a locally cooled distributor plate through a computer simulation.

As discussed above, it may be desirable to reheat any particles that are cooled by gases flowing through a cooled distribution plate as close as possible to the inlet area, by improving the gas distribution plate cooling system. A computer simulation was run with a 200 mm diameter reactor, heated by external means. Two different gas distribution plates were simulated. Both gas distribution plates had 13 orifices. The first gas distribution plate was a fully cooled gas distribution plate (similar to that of FIG. 7), and the second gas distribution plate was locally cooled (similar to that of FIG. 8). In both cases a curve showing the temperature variation along the reactor height was plotted, this plot is included as FIG. 11 of this disclosure. Position "0" represents the bottom of the reactor, just where the reaction chamber begins at the gas distribution plate surface.

Boundary Conditions:

Reactor: Schedule 40, 8 inch tube

External wall temperature: 900° C.

The particle size distribution average diameter (dp50%) was 1.700 microns, and maximum diameter was 2.200 microns (calculated as dp95% value).

A trichlorosilane and hydrogen mixture in a molar ratio 2:3 was used, resulting for a fluidization rate of 3 times Umf, calculated using the Wen & Yu equation described above, mass flows of 4.2 Kg/h of hydrogen, and 191 Kg/h of trichlorosilane.

Inlet temperature: 300° C.

Figure 11:
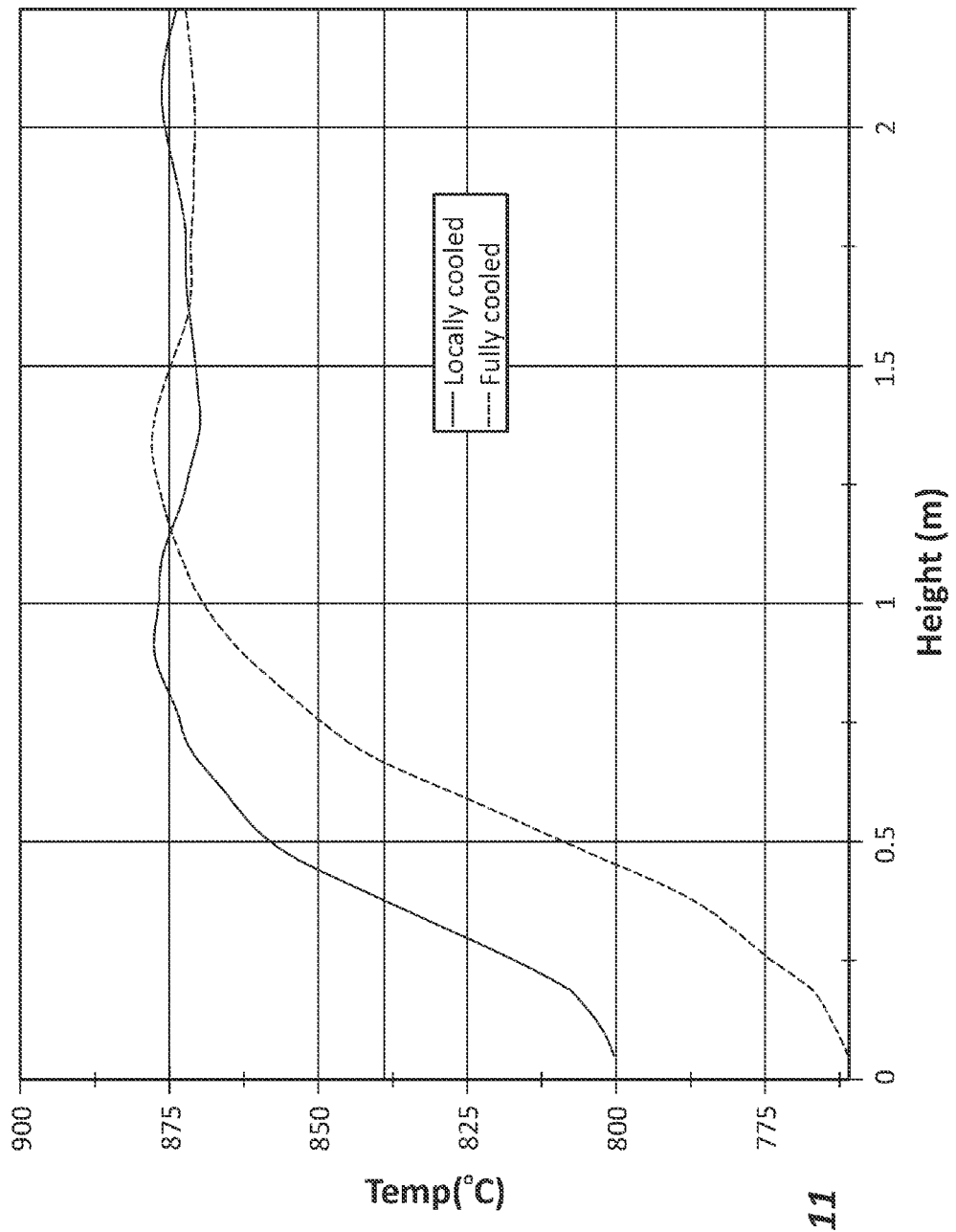
FIG. 11 is a graph showing a calculated temperature variation of silicon particles along the height of a reactor.

As shown in FIG. 11, reheating of the silicon beads to 850° C. was calculated to reach 0.75 m from the bottom of the reactor with the fully cooled gas distribution plate and 0.4 m from the bottom of the reactor with the locally cooled gas distribution plate. This resulted in an estimated decrease in the necessary reheating height of 0.35 m, or approximately 45% less reheating height.

Without further elaboration, it is believed that one skilled in the art can use the preceding description to utilize the present disclosure to its fullest extent. The examples and embodiments disclosed herein are to be construed as merely illustrative and exemplary and not as a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A gas distribution plate for use in connection with a fluidized bed reactor, the gas distribution plate comprising:
   an upper surface;
   a lower surface;
   a first gas injector extending to a first orifice in the upper surface, the gas injector configured to allow gas to pass from an area adjacent the lower surface to an area adjacent the upper surface; and
   a cooling system configured to cool a first portion of the upper surface, the first portion adjacent the first orifice and wherein the first portion comprises a ring zone around the first orifice.

2. The gas distribution plate of claim 1, further comprising an insulated layer disposed between the upper surface and the lower surface.

3. The gas distribution plate of claim 2, wherein the insulated layer is isolated from gas passing from the area adjacent the lower surface to the area adjacent the upper surface.

4. The gas distribution plate of claim 1, wherein the cooling system comprises a cooling fluid inlet, a cooling fluid outlet, and a cooling fluid.

5. The gas distribution plate of claim 4, further comprising a first cooling channel in fluid communication with the cooling fluid inlet and cooling fluid outlet.

6. The gas distribution plate of claim 5, wherein the cooling channel is configured to cool the first portion while minimizing heat transfer from other portions of the upper surface.

7. The gas distribution plate of claim 5, further comprising a first jacket configured to allow fluid communication between the cooling channel and a cooling area adjacent the first portion.

8. The gas distribution plate of claim 4, further comprising:
a plurality of gas injectors; and
a plurality of orifices in the upper surface, each gas injector of the plurality of gas injectors extending to an orifice of the plurality of orifices, the plurality of gas injectors configured to allow gas to pass from an area adjacent the lower surface to an area adjacent the upper surface;
wherein the cooling system is further configured to cool a plurality of ring zones of the upper surface, each ring zone of the plurality of ring zones adjacent the one of the orifices of the plurality of orifices.

9. The gas distribution plate of claim 8, wherein the cooling system further comprises a plurality of cooling channels in fluid communication with the cooling fluid inlet and cooling fluid outlet.

10. The gas distribution plate of claim 9, wherein the cooling channels are disposed below the lower surface.

11. The gas distribution plate of claim 10, further comprising a plurality of jackets, each jacket of the plurality of jackets configured to allow fluid communication between the cooling channels and one of a plurality of cooling areas adjacent one of the plurality of ring portions.

12. The gas distribution plate of claim 9, wherein the cooling channels are disposed between the lower surface and the upper surface.

13. The gas distribution plate of claim 12, wherein the cooling channels are surrounded by an insulated portion.

14. A fluidized bed reactor, comprising:
a plenum;
a reaction chamber;
a gas distribution plate disposed between the plenum and the reaction chamber, the gas distribution plate comprising:
an upper surface in fluid communication with the reaction chamber;
a lower surface in fluid communication with the plenum;
a plurality of gas injectors, each gas injector extending to one of a plurality of orifices in the upper surface, the plurality of gas injectors configured to allow gas to pass from the plenum to the reaction chamber; and
a cooling system configured to cool a plurality of ring zones of the upper surface, each ring zone of the plurality of ring zones adjacent to one of the orifices of the plurality of orifices.

15. The fluidized bed reactor of claim 14, wherein the cooling system further comprises a plurality of cooling channels in fluid communication with a cooling fluid inlet and a cooling fluid outlet.

16. The fluidized bed reactor of claim 15, wherein the cooling channels are disposed below the lower surface.

17. The fluidized bed reactor of claim 16, further comprising a plurality of jackets, each jacket of the plurality of jackets configured to allow fluid communication between the cooling channels and one of a plurality of cooling areas adjacent one of the plurality of ring zones.

18. The fluidized bed reactor of claim 15, wherein the cooling channels are disposed between the lower surface and the upper surface.

19. The fluidized bed reactor of claim 18, wherein the cooling channels are disposed within an insulated portion.

20. The fluidized bed reactor of claim 17, further comprising a thermal bridge breaking system configured to disrupt transfer of thermal energy from one or more walls of the fluidized bed reactor.

21. The fluidized bed reactor of claim 20, wherein the thermal bridge breaking system comprises a wall cooling flow path around the fluidized bed reactor.

22. The fluidized bed reactor of claim 21, wherein the thermal bridge breaking system is disposed adjacent the gas distribution plate.

23. The fluidized bed reactor of claim 21, wherein the thermal bridge breaking system is disposed adjacent the gas distribution plate and a wall of the plenum.

24. The fluidized bed reactor of claim 20, wherein a wall of the plenum comprises a lower flange and a wall of the reaction chamber comprises an upper flange, the upper and lower flanges configured to couple the plenum to the reaction chamber, and wherein the thermal bridge breaking system is configured to cool one of: the upper flange, the lower flange, or both the upper and lower flanges.

25. The fluidized bed reactor of claim 24, wherein the thermal bridge breaking system comprises a flange cooling channel disposed within the lower flange.

26. The fluidized bed reactor of claim 25, wherein the flange cooling channel is in fluid communication with the plurality of cooling channels.

27. A method of cooling the gas distribution plate of claim 1, in a fluidized bed reactor system, the method comprising:
delivering a cooling fluid to a portion of the gas distribution plate; and
locally cooling the ring zone of the gas distribution plate adjacent the first orifice of the gas distribution plate, while avoiding additional heat transfer from other portions of the gas distribution plate.

28. The method of claim 27, wherein the cooling fluid is delivered at a temperature below a decomposition temperature of a silicon-bearing gas.

29. The method of claim 27, wherein the gas distribution plate comprises an insulated portion configured to inhibit heat transfer from the other portions of the gas distribution plate to the cooling fluid.

30. The method of claim 27, further comprising delivering cooling fluid along a flow path adjacent a portion of a gas injector extending through the gas distribution plate, wherein the flow path directs cooling fluid in a direction substantially parallel to an axis of the gas injector.

* * * * *